June 24, 1947.  H. A. UNGERLAND  2,422,761
WINDSHIELD WIPER
Filed Nov. 1, 1944

INVENTOR
Henry A. Ungerland
BY
ATTORNEY

Patented June 24, 1947

2,422,761

UNITED STATES PATENT OFFICE 2,422,761

WINDSHIELD WIPER

Henry A. Ungerland, Oceanside, N. Y.

Application November 1, 1944, Serial No. 561,335

2 Claims. (Cl. 219—19)

This invention relates to windshield wipers, and aims to provide a novel, practical and efficient wiper which will not only melt and wipe away frozen vapor, sleet, or ice from the windshield but will also prevent the formation of mist on the inside of the windshield by warming the glass. Thereby clear and unimpaired vision may be had by the driver in weather which often makes it impossible to drive an automobile because of the obstructed vision through the windshield.

Another object of the invention is the provision of a windshield wiper unit in the form of a channel member having an electric heating unit mounted therein, with a coating of a combination insulating material and efficient wiper material, and a suitable material to answer this purpose is known to the trade as carsteel insulator or insulating material.

The above and other objects will become apparent in the following description, wherein characters of reference refer to like-numbered parts on the accompanying drawings. It is to be understood that the drawings are intended for the purpose of illustration only, and that it is neither desired nor intended that the invention be limited in any way to the specific details of construction shown excepting insofar as they may be deemed essential to the invention.

Referring briefly to the drawings.

Figure 1:
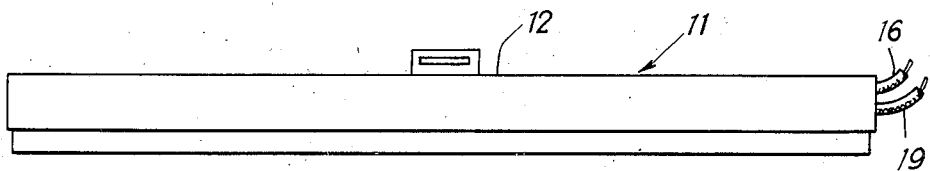
Fig. 1 is a side elevational view of the wiper member.
Figure 2:
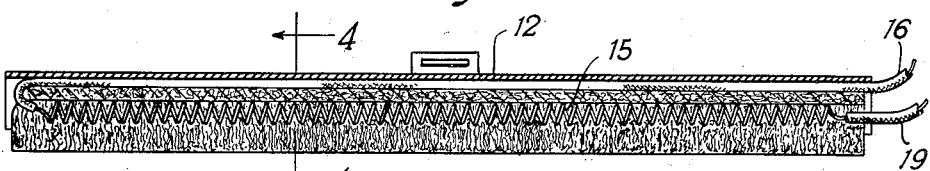
Fig. 2 is a longitudinal sectional elevational view of the same, taken on the line 2—2 of Fig. 4.
Figure 3:
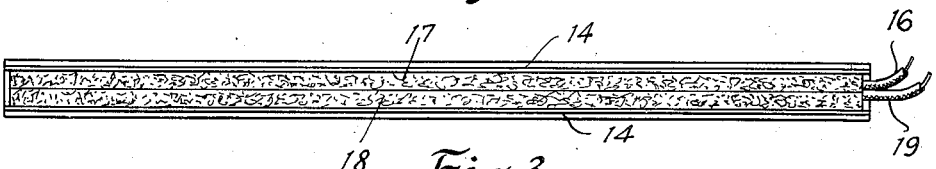
Fig. 3 is a bottom plan view of the wiper unit.
Figure 4:
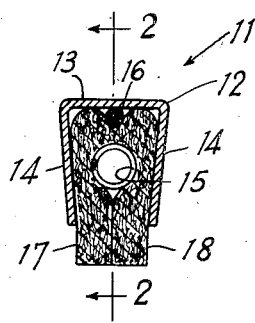
Fig. 4 is a cross-sectional elevational view taken on the line 4—4 of Fig. 2.
Figure 5:
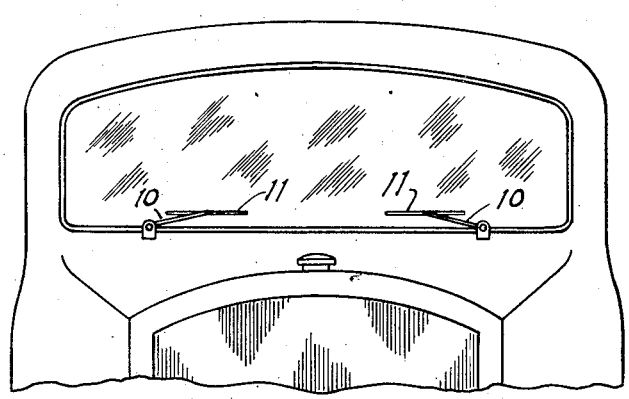
Fig. 5 is a fragmentary front view of an automobile, showing the application of the wiper member to the windshield wiper of an automobile.

Referring in detail to the drawings, the numeral 10 indicates the swing arm of a windshield wiper, to the end of which is secured in any desired manner the wiper unit or member 11 which comprises the present invention. Merely to indicate one means by which the wiper unit 11 may be secured to the arm 10, the former is shown with a slotted projection 12 thereon.

The member 11 comprises a channel member 12 having the back 13 and the two wings 14. A coiled heater element 15 extends longitudinally and approximately centrally through the channel 12, and a return wire, insulated, shown at 16, extends back along the back 13 of the channel. A rectangular pad of suitable electrical-insulating material which is at the same time suitable as a wiper, is wedged into the channel between the back 13 and the wings 14 with the element 15 clamped or held therebetween and the two mutually contacting edges 18 of the mounted pad 17 extending outward beyond the edges of the wings 14 and forming a flat surface at their extremities. A wire 19 leads from the heating element 15 and, together with the return wire 16, pass on to a suitable switch, not shown, forming part of a current supply circuit, not shown, to energize the element 15.

When in use, with the wiper unit 11 moving across the windshield and the heating element energized, heat will pass through the material 17 and thereby melt frost, sleet, or ice on the glass, and also warm the glass, and the projecting edges of the wiper unit, shown at 18, will wipe away the water thus formed.

In weather which is warmer than freezing, the edges 18 provide an efficient wiper edge to remove rain or water from the glass, without energizing the electrical heating element.

Thus a windshield wiper has been provided which is adaptable and efficient in all sorts of weather and whose use will enable the driving of a car in weather which at present frequently compels the car to be kept idle.

Obviously, modifications in form and structure may be made without departing from the spirit and scope of the invention.

I claim:

1. A windshield wiper comprising an elongated helical electric heating element, a relatively thick wrapper of insulating material substantially U-shaped in cross-section covering said element, said element nesting within the U against the inside of the base of the U between the arms of the U with said arms relatively short and brought together and extending from said element with their mutually adjacent surfaces in contact with each other thereby sealing said element, an elongated substantially channel-shaped housing having said wrapper and said element contained in the wrapper mounted therein with the base of said U in contact with the web of said member and with the flanges of said member in contact with said arms, said arms extending beyond the longitudinal edges of said flanges.

2. The windshield wiper set forth in claim 1, said flanges extending angularly toward each other thereby clamping said wrapper about said element and clamping said wrapper within said housing.

HENRY A. UNGERLAND.

REFERENCES CITED

The following references are of record in the file of this patent:

UNITED STATES PATENTS

| Number | Name | Date |
|---|---|---|
| 1,657,916 | Curtis | Jan. 31, 1928 |
| 1,811,440 | Shepard | June 23, 1931 |
| 1,885,710 | Gentry et al. | Nov. 1, 1932 |